April 9, 1946.  L. F. DAY  2,398,084
PNEUMATIC SHOCK ABSORBER FOR DROP HAMMERS
Filed Feb. 1, 1944  2 Sheets-Sheet 1
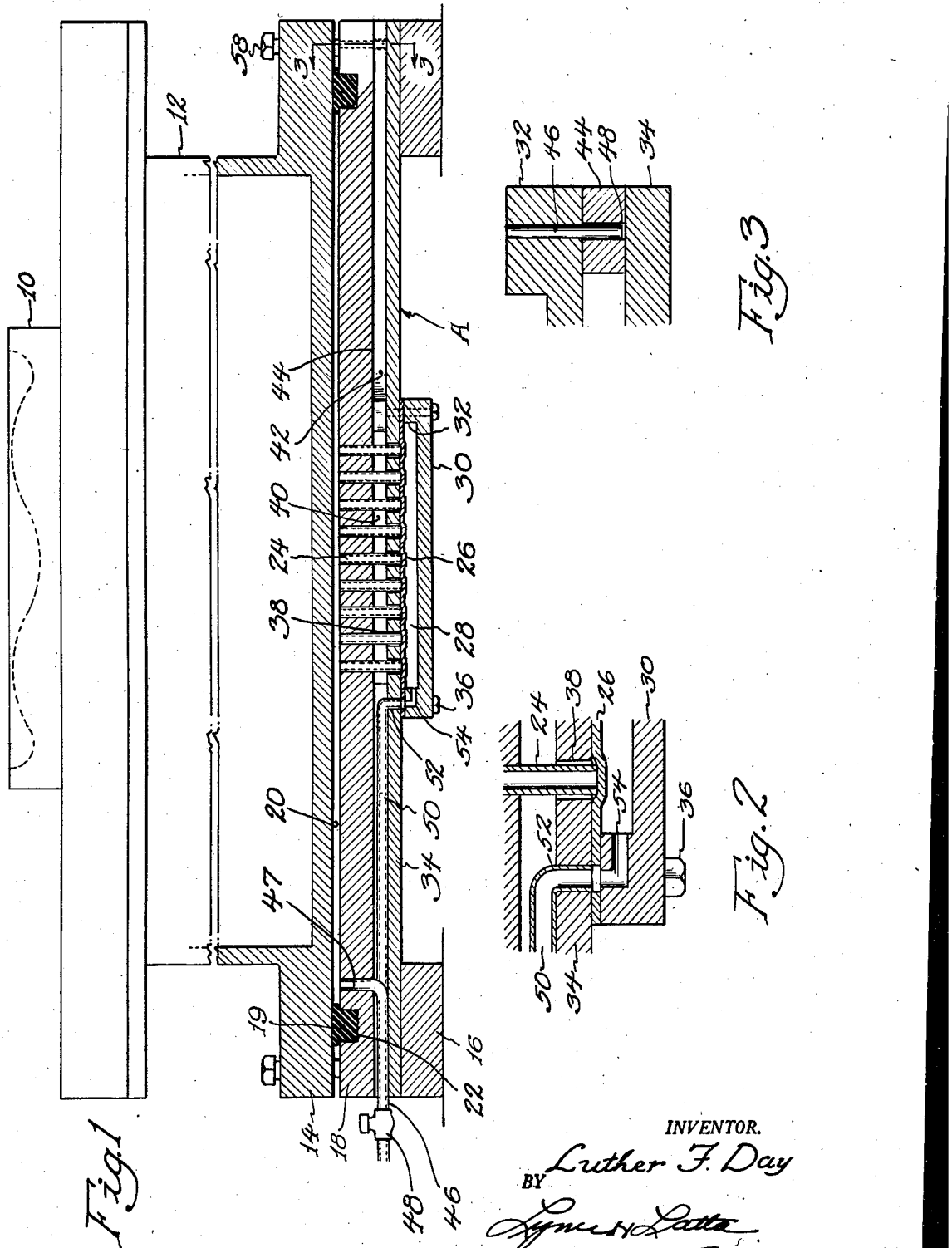
INVENTOR.
Luther F. Day
BY
Lynn H. Latta
Attorney April 9, 1946. L. F. DAY 2,398,084
PNEUMATIC SHOCK ABSORBER FOR DROP HAMMERS
Filed Feb. 1, 1944 2 Sheets-Sheet 2

INVENTOR.
BY Luther F. Day

Patented Apr. 9, 1946

2,398,084

UNITED STATES PATENT OFFICE 2,398,084

PNEUMATIC SHOCK ABSORBER FOR DROP HAMMERS

Luther F. Day, Hawthorne, Calif., assignor to North American Aviation, Inc., Inglewood, Calif., a corporation of Delaware Application February 1, 1944, Serial No. 520,611

15 Claims. (Cl. 188—94)

This invention relates to shock absorbers and has as its general object to provide a shock absorber capable of handling heavy shock loads, such as for example, the load transmitted to the lower die member of a drop hammer in the working stroke of the hammer.

More specifically, it is an object to provide a shock absorber which is adapted to absorb a heavy impact throughout a greater time interval than that involved in the absorption of shock in the conventional drop hammer or punch press operation, with a corresponding reduction in the maximum pressure developed by the impact.

In further detail, the invention contemplates an arrangement in which the anvil of a drop hammer or press is permitted to move through space a measurable distance under the impact of the striking member so that the blow is dissipated or absorbed to a large extent by the inertia of the anvil. The anvil is normally supported by a dampener, which yieldingly resists the movement induced in the anvil by the absorption of the impact and functions to restore the anvil to its original or normal position after the shock has been dissipated.

The invention further contemplates employment of a dampener which presents a yielding resistance of constant value, rendering more uniform, the resistance in the lower die element. A further object of the invention is to provide a shock absorber of a pneumatic type adapted to achieving uniform resistance by providing for controlled escape of air under pressure from the dampener, and providing for automatic restoration of the normal or initial working body of air in the dampener after the completion of each dampening operation.

Another object of the invention is to provide a shock absorber, which in addition to the characteristics specified above is capable of being adapted to an existing drop hammer or press installation without any substantial change in the drop hammer or press, and without even materially disturbing the position thereof in the installation.

A further object of the invention is to provide a shock absorber which is relatively simple and inexpensive in construction, and yet thoroughly practical and successful in operation.

In the drawings, like reference characters designate similar parts in the several views, of which:

Fig. 1 is a side view, partly in elevation and partly in section, of a drop hammer embodying the invention.

Fig. 2 is a detailed sectional view of a portion of the dampener, illustrating one of the pressure dissipating valves and a portion of the pressure restoring air duct, Fig. 3 is a detailed sectional view of a corner portion of the dampener, taken as indicated by the line 3—3 of Fig. 1.

Figure 4:
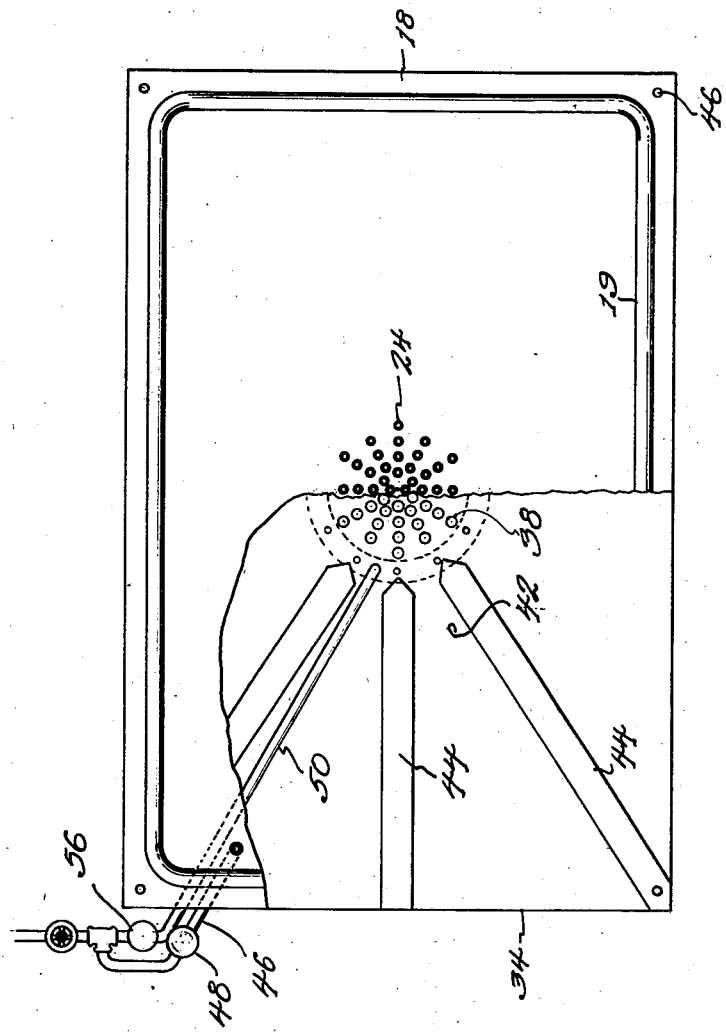
Fig. 4 is a plan view of the dampener, partly broken away to show the interior construction thereof.

As an example of one form in which the invention may be embodied, I have shown in the drawings a drop hammer embodying a lower die member 10, conventionally mounted on an anvil 12, having a flat base portion 14, which in a normal drop hammer installation would rest directly upon a foundation member 16.

The invention provides, in combination with the anvil 12, a dampener indicated generally at A, adapted to absorb the movement of the anvil 12, induced by the absorption by the latter of the blow transmitted to the lower die element 10. The dampener A comprises a plate 18 adapted to cooperate with the base 14 of the anvil and a yieldable gasket ring 19, interposed therebetween to form an air chamber 20. The gasket ring 19 is positioned in a recess 22, extending around the peripheral region of the plate 18. Air is maintained in the chamber 20 under pressure sufficient to support the weight of the anvil 12 and the die element 10.

Under the impact of the hammer blow, the anvil 12 is adapted to move downwardly, collapsing the chamber 20. The air is permitted to escape from the chamber 20 through a plurality of tubes 24, mounted in the plate 18 and projecting therebelow. Such escape of air is opposed with uniform resistance throughout the movement of the anvil 12, by a valve diaphragm 26 pressed against the lower ends of the tubes 24 by air under compression in a chamber 28. The chamber 28 is defined between the diaphragm 26 and a disk 30 having a raised rim portion 32 sealed to the diaphragm. The diaphragm 26 is clamped between the rim portion 32 and a plate 34 and acts as a gasket to seal these parts in fluid tight connection. The parts are secured together by machine screws 36 extended through the rim portion 32 and threaded into the plate 34.

The tubes 24 extend, with clearance, through openings 38 in the plate 34, with their ends in engagement with the diaphragm 26. The absorption of energy is accomplished by permitting the air from the chamber 20 to escape from the lower ends of the tubes 24 against the yielding resistance of the diaphragm 26 under a pressure differential which is maintained in the chamber 28 (the pressure in the chamber 28 being higher than that in the chamber 20). This differential of pressure functions to oppose the movement of the anvil 12 under the hammer blow, and is preferably adjusted to a point where the energy imparted to the anvil 12 by the hammer blow will be completely absorbed by the time the base portion 14 of the anvil makes contact with the plate 18.

The air escapes separately through the openings 38 into a space 40 between the plates 18 and 34 and thence outwardly through a plurality of radiating passages 42 to the atmosphere. The passages 42 are defined between a plurality of ribs 44 on the upper side of the plate 34. The plate 18 is supported on the upper faces of the ribs 44 and is positioned by four pins 46 (Fig. 3) mounted in the plate 18 and projecting downwardly into openings 48 in the outer ends of the ribs 44 at the corners of the plate 34.

Air under the predetermined pressure is supplied to the chamber 20 by a tube 46' extending into one of the passages 42 and thence upwardly through the plate 18 as at 47. The pressure of the air admitted to the tube 46 is controlled by a pressure responsive regulator valve 48, which may be of any suitable type, such as for example a diaphragm valve. Air under regulated pressure is similarly supplied to the chamber 28 by a tube 50 extending into one of the passages 42 and thence through the plate 34 as at 52. A port 54 in the rim portion 32 of the disk 30 connects the tube 50 to the chamber 28. A regulator valve 56 controls the pressure of the air admitted to the tube 50. The valves 48 and 56 may be adjusted to establish the proper pressures and pressure differential for the most efficient operation of the device.

After each impact has been absorbed, the air which has been forced out of the chamber 20 will be replaced by air injected into the chamber 20 from the tube 46. This inflow of air, assisted by the elasticity of the gasket ring 19, will restore the anvil 12 to its normal position.

Since the pressure in the chamber 28 is maintained at a constant level, the resistance to the escape of air from the tubes 24 is likewise constant. As a result, the absorption of energy from the anvil 12 is at a constant rate.

The hammer blow against the die element 10, instead of being absorbed substantially instantaneously as is the case where the anvil is mounted solidly on a relatively unyielding foundation, is absorbed over a measurable interval of time by the inertia of the anvil 12, the energy of the blow being translated into downward movement of the anvil 12 against the yielding resistance of the air cushion in the chamber 20 and the measured resistance of the air-pressed diaphragm 26 to the escape of air from the lower ends of the tube 24. The time element involved in the inertia of the anvil 12 provides for dissipation of the energy of the blow through a time interval. As a result, the pressure developed between the die elements is much less than that developed in conventional drop hammers, and die breakage is correspondingly reduced. This does not reduce the efficiency of the drop hammer in shaping a sheet of metal between the die elements. The total amount of work done between the die elements remains the same. Stated more briefly, a lighter pressure is maintained for a more prolonged period of time as contrasted to the much higher pressure exerted in a more instantaneous interval in the conventional installation, the total amount of work done, and the forming effectiveness remaining the same.

The dampening unit A is of relatively simple construction and is in the form of a pad which may be inserted in an existing drop hammer installation simply by jacking up the anvil 12 and inserting the dampener between the anvil and the foundation member 16. In place of the conventional hold-down bolts, I substitute a plurality of much longer bolts 58, which, extended through the dampener unit A and into the foundation 16, serve as guide pins for the anvil 12 in the vertical movement thereof. The showing of the foundation member 16 is to be taken as schematic only, it being preferred to rest the entire lower surface of the plate 34 and disk 30 solidly against a concrete foundation in which the disk 30 is embedded.

I claim as my invention:

1. In combination with an inertia member adapted to receive an impact, a dampener interposed between said inertia member and a supporting member, and having means permitting limited movement of the inertia member so that the latter may absorb the impact by inertia, and for absorbing the momentum thus imparted to the inertia member said dampener including an air chamber, and a pressure regulator for maintaining air in said chamber or releasing air therefrom in accordance with the differential in pressure of the air on opposite sides of said pressure regulator.

2. In combination with an inertia member adapted to receive an impact, means including an annular compressible ring cooperating with a face of said inertia member to form a pneumatic chamber adapted to be collapsed by movement of said inertia member under said impact, and means for controlled venting of the air from said chamber under said impact.

3. In combination with an inertia member adapted to receive an impact, an abutment member, a dampener interposed between said inertia member and such abutment member, said dampener comprising means cooperating with said inertia member to form a collapsible chamber in which air is maintained under pressure, an air vent from said chamber, a closure for said air vent and means for controlling the escape of air from said chamber under the momentum imparted to said inertia member by said impact and in accordance with the degree of pressure differential of the air on opposite sides of said closure.

4. In combination with the anvil member of an apparatus in which an impact is adapted to be imparted to said anvil member, a dampener interposed between the base of said anvil member and a supporting member, said dampener comprising a plate normally spaced below said base, a yieldable sealing ring interposed between said plate and said base and defining a collapsible chamber in which air is maintained under pressure sufficient to support the dead weight of said anvil, a tube mounted in said plate, communicating with said chamber at its upper end and projecting downwardly below said plate, and means normally sealing the lower end of said tube under pressure greater than that in said chamber to establish a fixed pressure differential adapted to uniformly resist the escape of air from said tube as said chamber is collapsed in the downward movement of said anvil under said impact.

5. The combination defined in claim 4, wherein said sealing means includes a lower plate interposed between said previously mentioned plate and the supporting member, the lower plate having an aperture receiving the lower end of said tube with clearance, a diaphragm engaging the lower end of said tube, means securing said diaphragm against the lower side of said lower plate and forming below said diaphragm a chamber in which air is maintained under a pressure higher than that in said previously mentioned chamber, and means spacing said lower plate below said first-mentioned plate to provide a passage through which air may escape from said aperture to atmosphere.

6. A dampener member adapted to be inserted between a supporting foundation and the base of the anvil of an apparatus in which an impact is imparted to said anvil, said dampener comprising an upper and a lower plate, means maintaining said plates in vertically spaced relationship and forming an air escape passage therebetween, said upper plate being adapted to be sealed to the base of said anvil to form a chamber in which air may be maintained under pressure sufficient to support the dead weight of said anvil, vent means communicating with said anvil and projecting downwardly below the upper plate and through the lower plate, means carried by said lower plate and cooperating with said vent means to provide a valve for the escape of air from said chamber, and means for applying a substantially constant pressure to said valve means greater than the pressure in said chamber, so as to provide a constant resistance to the escape of air from said chamber.

7. A dampener member adapted to be inserted between a supporting foundation and the base of the anvil of an apparatus in which an impact is imparted to said anvil, said dampener comprising an upper and a lower plate, means maintaining said plates in vertically spaced relationship and forming air-escape passages therebetween, said upper plate being adapted to be sealed to the base of said anvil to form a chamber in which air may be maintained under pressure sufficient to support the dead weight of said anvil, a plurality of tubes mounted in said upper plate, communicating with said chamber at their upper ends and projecting downwardly, and means normally sealing the lower ends of said tubes under pressure greater than that in said chamber to establish a fixed pressure differential adapted to uniformly resist the escape of air from said tubes as said chamber is collapsed in the downward movement of said anvil under said blow.

8. The combination defined in claim 7, wherein said sealing means includes a diaphragm engaging the lower ends of said tubes and means forming a chamber below said diaphragm in which air under pressure greater than that in said previously mentioned chamber is maintained.

9. A dampener adapted to be inserted between a supporting foundation and the base of an anvil of an apparatus in which an impact is imparted to said anvil, said dampener comprising a plate and an annular compressible ring cooperating with the lower face of said anvil base to form a pneumatic chamber adapted to be collapsed by compression of said ring between said plate and base to permit downward movement of said anvil under said impact, means to vent the air from said chamber as the latter is collapsed, and means yieldingly resisting the escape of air from said vent means with a pressure greater than the normal pressure in said chamber.

10. A dampener as defined in claim 9, wherein said last means comprises a diaphragm normally sealing said vent means and means forming a chamber in which air under pressure is effective to hold said diaphragm normally in said sealing relationship.

11. A dampener adapted to be inserted between a supporting foundation and the base of the anvil of an apparatus in which an impact is imparted to said anvil, said dampener comprising means adapted to cooperate with said base to form beneath said anvil a collapsible chamber in which air is maintained under pressure sufficient to support the dead weight of said anvil, means forming a vent for said chamber, and means normally closing said vent under the influence of air pressure greater than the normal air pressure in said chamber, but adapted to yield upon collapse of said chamber under impact imparted to said anvil and increase in air pressure in said chamber to a pressure greater than air pressure normally effecting closure of said vent.

12. A shock absorbing device for use in connection with an impact receiving member comprising means cooperating with said member to form an air chamber, a tube for venting air from said chamber, a member having an opening through which the discharge end of said tube projects, a diaphragm normally in contact with and sealing the said discharge end, and means for applying air pressure to said diaphragm to seal the same against said discharge end with a pressure greater than the normal pressure within said chamber, but adapted to yield under increased pressure in said chamber caused by an impact received by said impact member.

13. In compliance with an inertia member adapted to receive an impact, a dampener interposed between said inertia member and a supporting member and having means permitting limited movement of the inertia member so that the latter may absorb the impact by inertia and for absorbing the momentum thus imparted to the inertia member, said dampener including a collapsible pneumatic chamber, means for maintaining air in said chamber under predetermined pressure, and a closure for said chamber permitting controlled escape of air from said chamber under the momentum imparted to said inertia member by said impact and in accordance with the differential in air pressure on opposite sides of said closure.

14. A dampener adapted to be inserted between a supporting foundation and the base of the anvil of an apparatus in which an impact is imparted to said anvil, said dampener comprising means adapted to cooperate with said base to form beneath said anvil a collapsible chamber in which air is maintained under pressure sufficient to support the dead weight of said anvil, means forming a vent for said chamber, and means normally closing said vent under the influence of air pressure greater than the normal air pressure in said chamber, but adapted to yield upon collapse of said chamber under impact imparted to said anvil and increase in air pressure in said chamber to a pressure greater than air pressure normally effecting closure of said vent, and a pressure responsive regulator valve controlling injection of air into said chamber at a predetermined pressure for raising the anvil to its normal position.

15. A dampener adapted to be inserted between a supporting foundation and the base of the anvil of an apparatus in which an impact is imparted to said anvil, said dampener comprising means adapted to cooperate with said base to form beneath said anvil a collapsible chamber in which air is maintained under pressure sufficient to support the dead weight of said anvil, means forming a vent for said chamber, and means normally closing said vent under a pressure greater than the normal pressure in said chamber, but adapted to yield under momentum imparted to said anvil by said impact so as to permit said chamber to collapse as said momentum is absorbed, said closing means comprising a diaphragm normally sealing said vent, and means forming a chamber in which air under pressure greater than the normal pressure in said latter chamber is effective to normally hold said diaphragm in its sealing relationship.

LUTHER F. DAY.